(12) United States Patent
Tomita et al.

(10) Patent No.: US 12,247,575 B2
(45) Date of Patent: Mar. 11, 2025

(54) SEALING MEMBER AND SUBMERGED PUMP SYSTEM

(71) Applicant: NIKKISO CO., LTD., Tokyo (JP)

(72) Inventors: Yasuo Tomita, Tokyo (JP); Motoyasu Ogawa, Tokyo (JP); Masaaki Eguchi, Saitama (JP)

(73) Assignee: NIKKISO CO., LTD., Tokyo (JP)

( * ) Notice: Subject to any disclaimer, the term of this patent is extended or adjusted under 35 U.S.C. 154(b) by 169 days.

(21) Appl. No.: 18/068,727

(22) Filed: Dec. 20, 2022

(65) Prior Publication Data

US 2023/0204043 A1 Jun. 29, 2023

(30) Foreign Application Priority Data

Dec. 27, 2021 (JP) ................................. 2021-213267

(51) Int. Cl.
| | |
|---|---|
| F16J 3/04 | (2006.01) |
| F04B 23/02 | (2006.01) |
| F04B 45/02 | (2006.01) |
| F04D 13/08 | (2006.01) |
| F04D 13/16 | (2006.01) |
| F04D 29/08 | (2006.01) |

(52) U.S. Cl.
CPC .......... *F04D 29/086* (2013.01); *F04B 23/021* (2013.01); *F04B 45/02* (2013.01); *F04D 13/086* (2013.01); *F04D 13/16* (2013.01)

(58) Field of Classification Search
CPC ...... F04D 13/086; F04D 13/16; F04D 29/086; F04D 29/08; F04B 23/021; F04B 45/02; F04B 39/047; F17C 2227/0135; F17C 9/00; F17J 15/52; F17J 15/525; F16J 3/048; F16J 3/047; F16J 3/04
USPC ............. 417/361; 310/12.01–12.33; 62/50.6; 92/34–37; 277/122, 123; 251/335.3
See application file for complete search history.

(56) References Cited

U.S. PATENT DOCUMENTS

| | | | | |
|---|---|---|---|---|
| 2,693,822 | A | * 11/1954 | Gerow | .................... F16K 41/10 |
| | | | | 137/315.07 |
| 3,773,266 | A | * 11/1973 | Raefield | .............. B05B 13/0405 |
| | | | | 239/243 |

(Continued)

FOREIGN PATENT DOCUMENTS

JP 2017-132619 A 8/2017

*Primary Examiner* — Philip E Stimpert
*Assistant Examiner* — Dnyanesh G Kasture
(74) *Attorney, Agent, or Firm* — WC&F IP

(57) ABSTRACT

A sealing member according to the present invention includes a head plate having a through hole and attached to an opening end of a pump column, a lift shaft penetrating the through hole and raised and lowered between a raised position and a lowered position in raising and lowering the pump, and a bellows member extending and contracting corresponding to the raising and lowering of the lift shaft. The bellows member includes a bellows tube covering an outer peripheral surface of a protruding portion of the lift shaft protruding upward from the head plate, a first attaching member disposed contiguously to an upper end of the bellows tube and attached to an upper end surface of the lift shaft, and a second attaching member disposed contiguously to a lower end of the bellows tube and attached to an upper surface of the head plate.

9 Claims, 5 Drawing Sheets

(56) References Cited

U.S. PATENT DOCUMENTS

| | | | | |
|---|---|---|---|---|
| 3,963,381 | A | * | 6/1976 | Kohnen .................. F04D 13/16 |
| | | | | 415/157 |
| 4,521,754 | A | * | 6/1985 | Ranghelli ................. H01P 7/04 |
| | | | | 333/226 |
| 4,537,385 | A | * | 8/1985 | Bragg ..................... F16K 41/00 |
| | | | | 137/553 |
| 5,678,595 | A | * | 10/1997 | Iwabuchi ................ F16K 51/02 |
| | | | | 137/341 |
| 2014/0035236 | A1 | * | 2/2014 | Takahashi ................. F16J 3/04 |
| | | | | 277/500 |
| 2015/0184645 | A1 | * | 7/2015 | Johnson ................. F17C 13/06 |
| | | | | 62/45.1 |

* cited by examiner

SEALING MEMBER AND SUBMERGED PUMP SYSTEM

TECHNICAL FIELD

The present invention relates to a sealing member and a submerged pump system.

BACKGROUND ART

A submerged pump system is used to remove liquefied gas from a storage tank in which the liquefied gas (liquefied natural gas, liquefied ammonia, etc.) is stored (for example, see JP2017-132619 A). A pump of the submerged pump system (submerged pump) is accommodated in a pump column that is provided extending from a ceiling of the storage tank into the liquefied gas and is submerged in the liquefied gas. A foot valve that opens under the own weight of the pump is attached to a lower end of the pump column. An upper end of the pump column is liquid-tightly sealed by a head plate. The head plate has a lift shaft, which allows the pump to be raised and lowered, attached penetrating the head plate. The lift shaft and the head plate are liquid-tightly sealed with a sealing material (e.g., gland seal) disposed between the lift shaft and the head plate.

In the submerged pump system, the pump is taken out of the storage tank for maintenance, for example. When the pump stops, the pump column is filled with residual liquefied gas and vaporized liquefied gas (vaporized gas). There is a technical problem that, when the head plate is removed in this state, the liquefied gas and the vaporized gas (hereinafter collectively referred to as "residual gas") leak to the outside. Since much of the residual gas is flammable and toxic, the residual gas needs to be removed prior to the removal of the head plate.

To remove the residual gas, a method of introducing an inert gas such as nitrogen into the pump column with the foot valve closed is used. In this method, the pump is raised by the lift shaft and the foot valve is closed prior to the introduction of the inert gas. In this case, in order to raise the lift shaft and close the foot valve, tightening to the sealing material is weakened in advance. As a result, the sealability of the sealing material decreases, and a small amount of residual gas may leak from a gap of the sealing material to the outside.

SUMMARY OF INVENTION

Technical Problem

An object of the present invention is to provide a sealing member and a submerged pump system capable of preventing leakage of residual gas in raising and lowering a pump.

Solution To Problem

A sealing member in one aspect of the present invention is a sealing member for sealing an opening end of a cylindrical pump column configured to accommodate a pump configured to be submerged in a handling liquid and for suspending and supporting the pump when the pump is raised and lowered in the pump column, the sealing member including: a head plate having a through hole extending in a vertical direction and attached to the opening end so as to close the opening end; a lift shaft disposed through the through hole and raised and lowered between a raised position and a lowered position when the pump is raised and lowered; and a bellows member that extends and contracts in an axial direction of the lift shaft corresponding to the raising and lowering of the lift shaft, in which the bellows member includes: a bellows tube covering an outer peripheral surface of a protruding portion of the lift shaft protruding upward from the head plate; a first attaching member disposed contiguously to an upper end of the bellows tube and attached to an upper end surface of the lift shaft; and a second attaching member disposed contiguously to a lower end of the bellows tube and attached to an upper surface of the head plate.

A submerged pump system in one aspect of the present invention includes: a pump configured to be submerged in a handling liquid; a cylindrical pump column configured to accommodate the pump; and the sealing member.

Advantageous Effects of Invention

The present invention is able to provide the sealing member and the submerged pump system capable of preventing leakage of residual gas in raising and lowering the pump.

DESCRIPTION OF EMBODIMENTS

Figure 1:
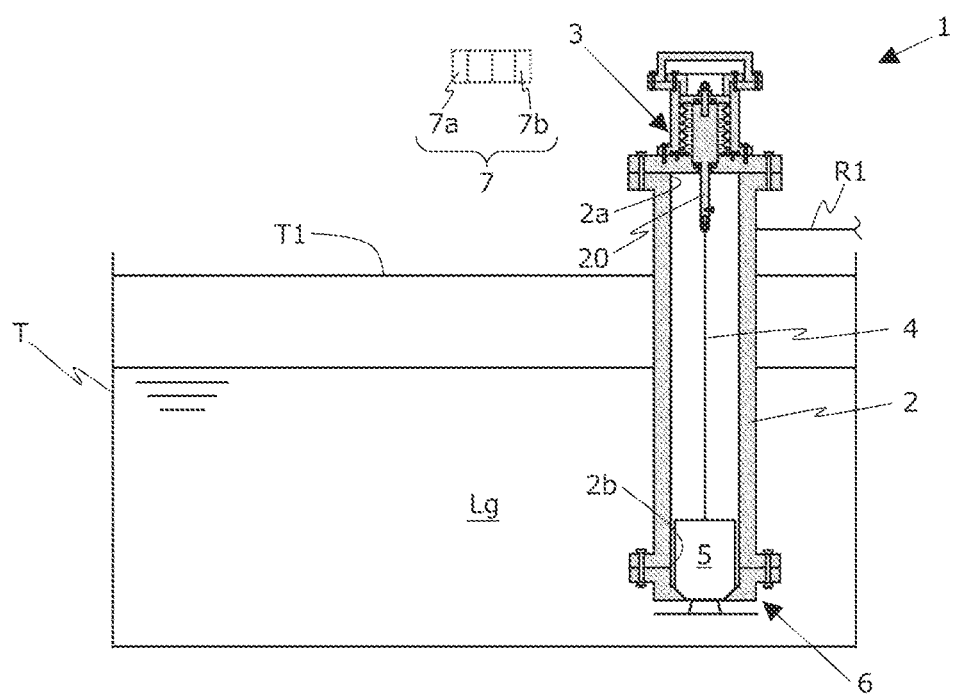
FIG. 1 is a schematic cross-sectional view of a submerged pump system illustrating an embodiment of the submerged pump system according to the present; invention.

Embodiments of a sealing member and a submerged pump system according to the present invention will be described below with reference to the drawings. In the drawings, the same members and components are indicated with the same reference signs, and repetitive description thereof will be omitted. In the drawings, a shape and size of each member are intentionally emphasized and illustrated more than the actual dimensions thereof in order to clarify the configuration of each member.

In the following description and drawings, "downward" is the direction of gravity and "upward" is the opposite direction of downward.

Submerged Pump System

First, an embodiment of the submerged pump system according to the present invention will be described
Configuration of Submerged Pump System FIG. 1 is a schematic cross-sectional view of the submerged pump system illustrating the embodiment of the submerged pump system according to the present invention.

A submerged pump system 1 is attached to a storage tank T in which liquefied gas Lg is stored and feeds the liquefied gas Lg from the storage tank T to the outside. The submerged pump system 1 includes a pump column 2, a sealing member 3, a support cable 4, a submerged pump (hereinafter referred to as "pump") 5, a foot valve 6, and a color 7. In the present embodiment, the liquefied gas Lg is liquefied ammonia. The liquefied ammonia is an example of a handling liquid in the present invention.

Note that, in the present invention, the handling liquid is not limited to the liquefied ammonia. That is, for example, the handling liquid may be liquefied natural gas.

The pump column 2 accommodates the pump 5 and also functions as a liquid feeding path for the liquefied gas Lg discharged from the pump 5. The pump column 2 has a cylindrical shape. The Pump column 2 is disposed penetrating a ceiling T1 of the storage tank T and provided extending from the ceiling T1 into the liquefied gas Lg. A liquid feeding path R1 for the liquefied gas Lg is connected to an upper outer peripheral surface of the pump column 2.

The sealing member 3 liquid-tightly seals an upper opening end 2a of the pump column 2 and also, when the pump 5 is raised and lowered in the pump column 2, suspends and supports the pump 5 via the support cable 4. The sealing member 3 is an example of the sealing member according to the present invention, and a specific configuration thereof will be described later.

The support cable 4 suspends and supports the pump 5 when raising and lowering the pump 5 in the pump column 2. The support cable 4 is made of a metal wire, for example. The support cable 4 is connected to a lift shaft 20 described later and the pump 5.

The pump 5 discharges, into the pump column 2, the liquefied gas Lg flowing in from the foot valve 6. The pump 5 is, for example, a known submerged pump including a multi-stage centrifugal pump and a motor that drives the multi-stage centrifugal pump. The power of the pump 5 is supplied via a power cable (not illustrated) connected to the sealing member 3. The pump 5 is accommodated in a lower portion of the pump column 2 and is submerged in the liquefied gas Lg.

The foot valve 6 opens and closes a lower opening end 2b of the pump column 2. The foot valve 6 opens under the own weight of the pump 5 when the pump 5 is accommodated in the lower portion of the pump column 2, and the foot valve 6 closes by a biasing force of a spring (not illustrated) when the pump 5 is lifted.

The color 7 fixes the lift shaft 20 described later to a raised position described later. The color 7 is formed in a cylindrical shape by two half-cylindrical shaped members 7a and 7b. That is, the color 7 can be disassembled into the two half-cylindrical members 7a and 7b. The color 7 is a maintenance member used when the pump 5 is taken out, and the color 7 is not used when the pump 5 is in operation. Thus, in FIG. 1, the color 7 is illustrated with a dashed line.

Configuration of Sealing Member

Next, a specific configuration of the sealing member 3 (the sealing member according to the present invention) will be described.

Figure 2:
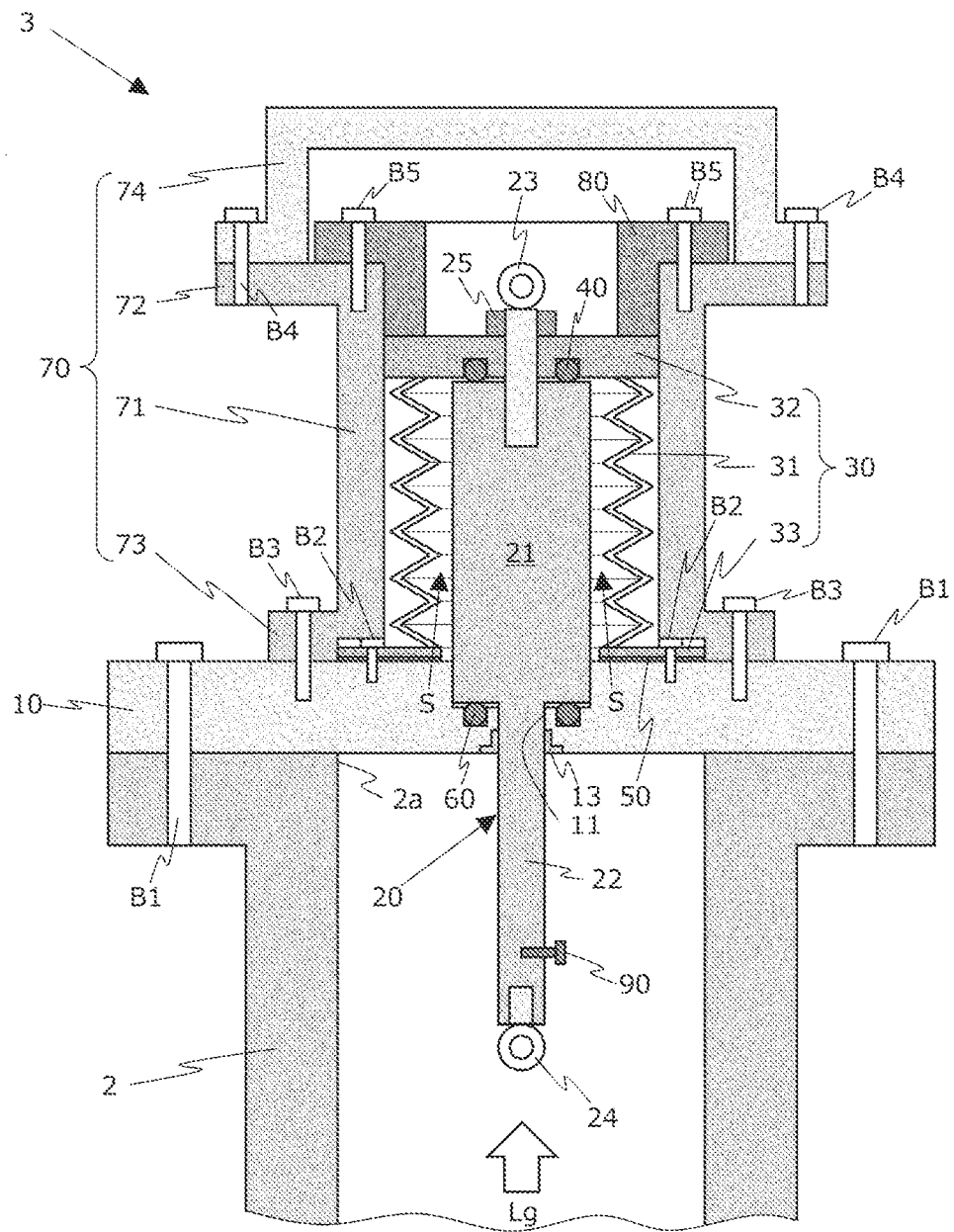
FIG. 2 is a schematic cross-sectional view of a sealing member illustrating an embodiment of the sealing member according to the present invention.

FIG. 2 is a schematic cross-sectional view of the sealing member 3 illustrating the embodiment of the sealing member 3.

Figure 3:
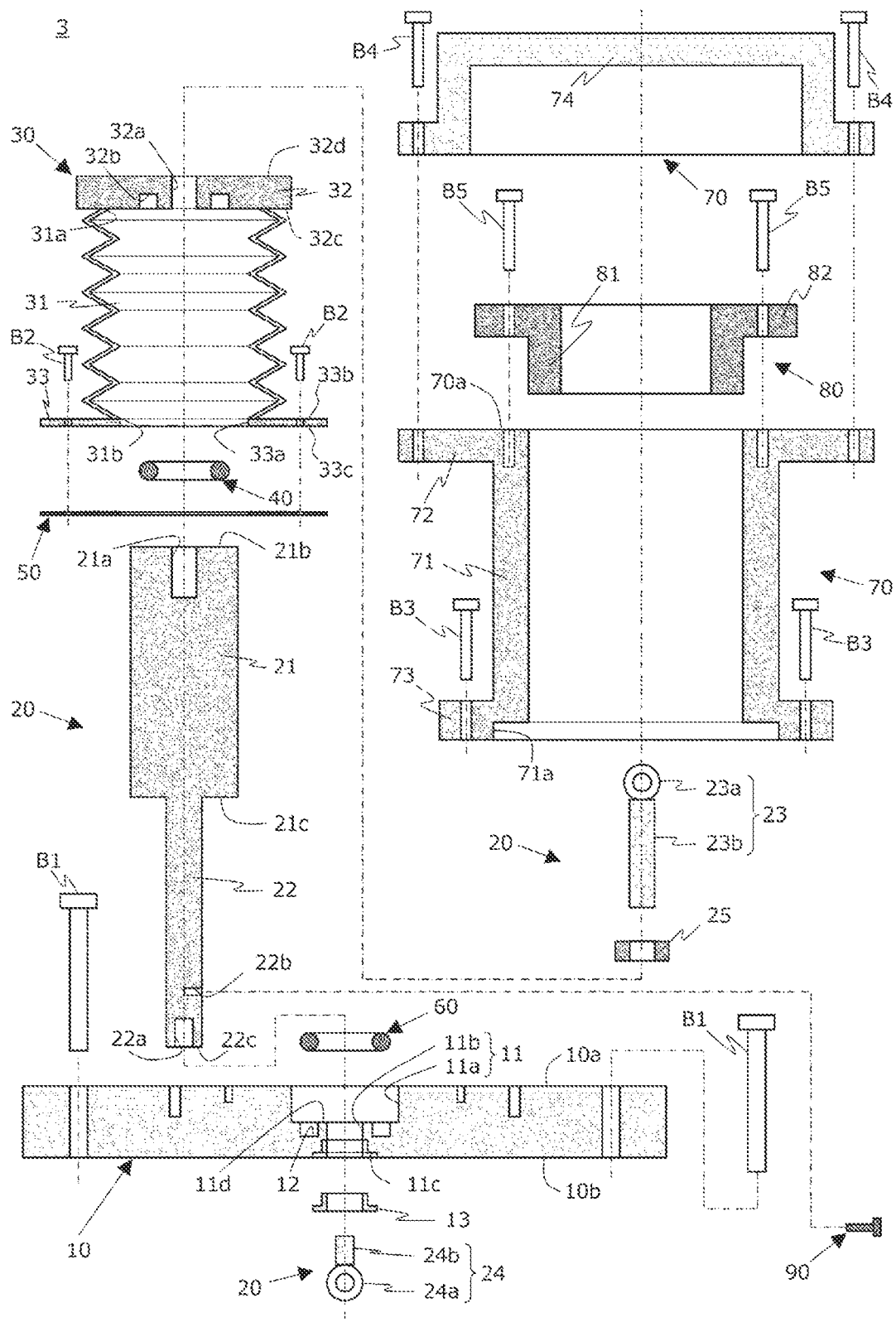
FIG. 3 is a schematic exploded cross-sectional view of the sealing member in FIG. 2.

FIG. 3 is a schematic exploded cross-sectional view of the sealing member 3.

FIG. 2 illustrates the sealing member 3 when the lift shaft 20 described later is located in a lowered position. FIG. 2 also illustrates an upper portion of the pump column 2 for convenience of description. In the following description, bolt holes corresponding to bolts B1 to B5 described later are a well-known technique, and the description thereof will be omitted. In the following description, FIG. 1 will be referred to as necessary.

The "lowered position" is a position (the position illustrated in FIG. 2) where the lift shaft 20 is lowered and a downward movement is restricted by a head plate 10 described later. The "raised position" is a position (the position illustrated in FIG. 4) where the lift shaft 20 is raised and the color 7 is attachable to the sealing member 3. In the present embodiment, the raised position is a position where an upward movement of the lift shaft 20 is restricted by a movement restricting member 90 described later.

The sealing member 3 includes the head plate 10, the lift shaft 20, a bellows member 30, an upper sealing member 40, a lower sealing member 50, a shaft sealing member 60, a housing 70, a shaft fixing member 80, the movement restricting member 90, a plurality of plate attaching bolts B1, a plurality of bellows attaching bolts B2, a plurality of housing attaching bolts B3, a plurality of lid attaching bolts B4, and a plurality of pressing bolts B5.

The head plate 10 functions as a lid for closing the upper opening end 2a of the pump column 2. The head plate 10 has a disc shape, for example. The head plate 10 is made of metal such as stainless steel, for example. The head plate 10 includes an insertion hole 11, a seal groove 12, and a guide member 13.

The insertion hole 11 is a through hole that penetrates the head plate 10 in the vertical direction. That is, the insertion hole 11 extends in the vertical direction in the head plate 10. The insertion hole 11 is disposed at the center of the head plate 10. The insertion hole 11 is an example of the through hole in the present invention. The insertion hole 11 includes a first hole portion 11a and a second hole portion 11b.

The first hole portion 11a is a circular hole into which a lower portion of a first shaft portion 21 described later of the lift shaft 20 is inserted when the lift shaft 20 is located in the lowered position. The second hole portion 11b is a circular hole through which a second shaft portion 22 described later of the lift shaft 20 is disposed. The first hole portion 11a is disposed contiguously to the second hole portion 11b above the second hole portion 11b. The first hole portion 11a is disposed concentrically with the second hole portion 11b. The inner diameter of the first hole portion 11a is larger than the inner diameter of the second hole portion 11b.

The diameter of a lower portion of the second hole portion 11b is enlarged in two stages and constitutes a fitting portion 11c into which the guide member 13 is fitted.

The seal groove 12 is a ring-shaped groove in which the shaft sealing member 60 is disposed. The seal groove 12 is disposed concentrically with the first hole portion 11a on a bottom surface 11d of the first hole portion 11a.

The guide member 13 guides the raising and lowering of the lift shaft 20. The guide member 13 has a cylindrical shape with flange portion at the lower end. The guide member 13 is fitted into the fitting portion 11c of the second hole portion 11b. The inner diameter of the guide member 13 is approximately the same as the inner diameter of the second hole portion 11b. With respect to the outer diameter dimension of the lift shaft 20 (the second shaft portion 22 described later), a dimensional tolerance (gap) of the inner diameter of the guide member 13 is smaller than a dimensional tolerance of the inner diameter of the second hole portion 11b.

The lift shaft 20 is raised and lowered between the raised position and the lowered position when the pump 5 is raised and lowered and supports the pump 5 via the support cable 4. The lift shaft 20 includes the first shaft portion 21, the second shaft portion 22, a first connecting member 23, a second connecting member 24, and a nut member 25.

The first shaft portion 21 restricts the downward movement of the lift shaft 20 lower than the lowered position. The second shaft portion 22 guides the raising and lowering of the lift shaft 20 together with the second hole portion 11b of the head plate 10. The first shaft portion 21 and the second shaft portion 22 have a columnar shape long in the vertical direction. The first shaft portion 21 is disposed contiguously to the second shaft portion 22 above the second shaft portion 22 and is integrally formed with the second shaft portion 22. That is, the first shaft portion 21 and the second shaft portion 22 constitute one shaft body. The first shaft portion 21 is disposed concentrically with the second shaft portion 22. The outer diameter of the first shaft portion 21 is larger than the outer diameter of the second shaft portion 22 and slightly smaller than the inner diameter of the first hole portion 11a. The outer diameter of the second shaft portion 22 is slightly smaller than the inner diameters of the second hole portion 11b and the guide member 13.

The first shaft portion 21 includes an internal thread hole 21a. The internal thread hole 21a opens on an upper end surface 21b of the first shaft portion 21 along the vertical direction.

The second shaft portion 22 includes a first internal thread hole 22a and a second internal thread hole 22b. The first internal thread hole 22a opens on a lower end surface 22c of the second shaft portion 22 along the vertical direction. The second internal thread hole 22b opens on an outer peripheral surface of the lower portion of the second shaft portion 22 along the horizontal direction.

The first connecting member 23 is a member to which a cable (not illustrated) from a lift (not illustrated) is connected when the pump 5 is raised and lowered. The first connecting member 23 includes a ring-shaped connecting portion 23a and an external thread portion 23b extending downward from the connecting portion 23a. The first connecting member 23 is attached to the upper end of the first shaft portion 21 by screwing the external thread portion 23b into the internal thread hole 21a.

The second connecting member 24 is a member to which the support cable 4 is connected. The second connecting member 24 includes a ring-shaped connecting portion 24a and an external thread portion 24b extending upward from the connecting portion 24a. The second connecting member 24 is attached to the lower end of the second shaft portion 22 by screwing the external thread portion 24b into the first internal thread hole 22a.

The nut member 25 presses a first attaching member 32 described later toward the upper end surface 21b of the first shaft portion 21. The nut member 25 is attached to the external thread portion 23b of the first connecting member 23.

The lift shaft 20 is inserted through the insertion hole 11 of the head plate 10 from above and is disposed penetrating the insertion hole 11. The lift shaft 20 can be raised and lowered between the lowered position and the raised position when the pump 5 is raised and lowered. The second shaft portion 22 is guided by the guide member 13, and thus the lift shaft 20 can be raised and lowered smoothly without rattling.

When the lift shaft 20 is located in the lowered position, the lower portion of the first shaft portion 21 is disposed into the first hole portion 11a and the second shaft portion 22 is disposed through the second hole portion 11b and the guide member 13. In this case, the first shaft portion 21 protrudes above the head plate 10 and the second shaft portion 22 protrudes below (in the pump column 2) the head plate 10. In contrast, when the lift shaft 20 is located in the raised position, the first shaft portion 21 is located above the head plate 10. The second shaft portion 22 is disposed through the first hole portion 11a, the second hole portion 11b, and the guide member 13 and protrudes out of the head plate 10 in the vertical direction.

The bellows member 30 extends and contracts in the axial direction (the vertical direction) of the lift shaft 20 corresponding to the raising and lowering of the lift shaft 20 and also liquid-tightly seals between the head plate 10 and the lift shaft 20. The bellows member 30 includes a bellows tube 31, the first attaching member 32, and a second attaching member 33.

The bellows tube 31 extends and contracts corresponding to the raising and lowering of the lift shaft 20. The bellows tube 31 is a cylindrical-shaped bellows with ring-shaped crest portions and root portions continued in the vertical direction. The bellows tube 31 is made of metal such as stainless steel, for example. The inner diameter of the bellows tube 31 (the inner diameter of the root portion) is larger than the outer diameter of the first shaft portion 21 of the lift shaft 20. The outer diameter of the bellows tube 31 when extended (the outer diameter of the crest portion) is smaller than the inner diameter of the color 7.

The first attaching member 32 attaches the bellows tube 31 to the lift shaft 20. The first attaching member 32 is disposed contiguously to an upper end 31a of the bellows tube 31 above the bellows tube 31. The first attaching member 32 has a ring plate shape. The first attaching member 32 includes an insertion hole 32a and a seal groove 32b. The outer diameter of the first attaching member 32 is larger than the outer diameter of the bellows tube 31.

The insertion hole 32a is a through hole that penetrates the first attaching member 32 in the vertical direction. The insertion hole 32a is disposed at the center of the first attaching member 32. The inner diameter of the insertion hole 32a is smaller than the outer diameter of the first shaft portion 21.

The seal groove 32b is a ring-shaped groove in which the upper sealing member 40 is disposed. The seal groove 32b is disposed concentrically with the insertion hole 32a on a lower surface 32c of the first attaching member 32.

The second attaching member 33 attaches the bellows tube 31 to the head plate 10. The second attaching member 33 has a ring plate shape. The second attaching member 33 is disposed contiguously to a lower end 31b of the bellows tube 31 below the bellows tube 31. The second attaching member 33 includes an insertion hole 33a.

The insertion hole 33a is a through hole that penetrates the second attaching member 33 in the vertical direction. The insertion hole 33a is disposed at the center of the second attaching member 33.

The upper end 31a of the bellows tube 31 is liquid-tightly welded to the lower surface 32c of the first attaching member 32 over the entire circumference of the bellows tube 31 in the circumferential direction. The lower end 31b of the bellows tube 31 is liquid-tightly welded to an upper surface 33b of the second attaching member 33 over the entire circumference of the bellows tube 31 in the circumferential direction. As a result, the bellows tube 31, the first attaching member 32, and the second attaching member 33 are integrally formed. In the radial direction of the first attaching member 32, the seal groove 32b is disposed inward of the upper end 31a of the bellows tube 31.

The second attaching member 33 is fastened to the head plate 10 with the bellows attaching bolts B2, and thus the bellows member 30 is attached to an upper surface 10a of the head plate 10. The bellows tube 31 accommodates a portion of the lift shaft 20 protruding upward from the head plate 10 (hereinafter referred to as "protruding portion") and covers an outer peripheral surface of the protruding portion. The protruding portion varies depending on the raising and lowering of the lift shaft 20, the protruding portion in the lowered position is a part of the first shaft portion 21, and the protruding portion in the raised position is the whole of the first shaft portion 21 and a part of the second shaft portion 22. A space surrounded by the bellows tube 31 (hereinafter referred to as "bellows internal space S") exists between the bellows tube 31 and the lift shaft 20. The bellows internal space S allows variation in the inner diameter (the outer diameter) of the bellows tube 31 with extension and contraction of the bellows tube 31.

The external thread portion 23b of the first connecting member 23 is disposed through the insertion hole 32a. The connecting portion 23a of the first connecting member 23 and the nut member 25 are disposed above the first attaching member 32. The nut member 25 abutting on an upper surface 32d of the first attaching member 32 is tightened, and thus the first attaching member 32 is pressed downward (toward the first shaft portion 21).

The upper sealing member 40 is an O-ring made of fluororesin, for example. The upper sealing member 40 is disposed in the seal groove 32b of the first attaching member 32. The upper sealing member 40 is disposed between the upper end surface 21b of the first shaft portion 21 of the lift shaft 20 and the lower surface 32c (the seal groove 32b) of the first attaching member 32 and liquid-tightly seals therebetween. The sealability of the upper sealing member 40 is determined by the tightening force of the nut member 25. That is, the sealability is deteriorated when the nut member 25 is loosened, and the sealability is improved when the nut member 25 is tightened.

The lower sealing member 50 is a gasket made of fluororesin, for example. The lower sealing member 50 is disposed between the upper surface 10a of the head plate 10 and a lower surface 33c of the second attaching member 33 and liquid-tightly seals therebetween. The sealability of the lower sealing member 50 is determined by the tightening force of the bellows attaching bolts B2. That is, the sealability is deteriorated when the bellows attaching bolts B2 are loosened, and the sealability is improved when the bellows attaching bolts B2 are tightened.

The shaft sealing member 60 is an O-ring made of fluororesin, for example. The shaft sealing member 60 is disposed in the seal groove 12 of the head plate 10. When the lift shaft 20 is located in the lowered position, the shaft sealing member 60 is disposed between the bottom surface 11d (the seal groove 12) of the first hole portion 11a of the head plate 10 and a lower end surface 21c of the first shaft portion 21 of the lift shaft 20 and liquid-tightly seals there between. The sealability of the shaft sealing member 60 is determined by the tightening force of the pressing bolts B5 described later. That is, the sealability is deteriorated when the pressing bolts B5 are loosened, and the sealability is improved when the pressing bolts B5 are tightened.

The housing 70 accommodates the first shaft portion 21 and the bellows member 30 when the lift shaft 20 is located in the lowered position. The housing 70 includes a tube portion 71, a first flange portion 72, a second flange portion 73, and a lid portion 74.

The tube portion 71 has a cylindrical shape. The inner diameter of the tube portion 71 is larger than the outer diameter of the bellows tube 31 (the outer diameter of the crest portion) and smaller than the inner diameter of the color 7. The inner surface of a lower end portion of the tube portion 71 is enlarged in diameter and constitutes an accommodating portion 71a in which the second attaching member 33, the lower sealing member 50, and the bellows attaching bolts B2 are accommodated. In the radial direction of the tube portion 71, an upper end portion of the tube portion 71 protrudes outward and constitutes the ring plate-shaped first flange portion 72. The lower end portion of the tube portion 71 protrudes outward and constitutes the ring plate-shaped second flange portion 73. That is, the tube portion 71, the first flange portion 72, and the second flange portion 73 are integrally formed.

The lid portion 74 protects the inside of the tube portion 71 from wind, rain, and the like. The lid portion 74 has a hat shape. The lid portion 74 is fastened to the first flange portion 72 of the tube portion 71 with the lid attaching bolts B4, and thus the lid portion 74 covers an upper opening of the tube portion 71.

The second flange portion 73 is fastened to the head plate 10 with the housing attaching bolts B3, and thus the housing 70 is attached on the upper surface 10a of the head plate 10. In this case, the second attaching member 33, the lower sealing member 50, and the bellows attaching bolts B2 are accommodated in the accommodating portion 71a.

The shaft fixing member 80 fixes the lift shaft 20 to the lowered position when the lift shaft 20 is located in the lowered position. The shaft fixing member 80 includes a peripheral wall portion 81 and a flange portion 82.

The peripheral wall portion 81 has a cylindrical shape. The outer diameter of the peripheral wall portion 81 is approximately the same as the outer diameter of the bellows tube 31 (the outer diameter of the crest portion). In the radial direction of the peripheral wall portion 81, an upper end of the peripheral wall portion 81 protrudes outward and constitutes the ring plate-shaped flange portion 82. That is, the peripheral wall portion 81 and the flange portion 82 are integrally formed. The outer diameter of the flange portion 82 is larger than the outer diameter of the bellows tube 31. The peripheral wall portion 81 is disposed into the tube portion 71. When the shaft fixing member 80 is not fastened to the housing 70 with the pressing bolts B5, the length of the portion of the peripheral wall portion 81 lower than the flange portion 82 is longer than the length between an upper end surface 70a of the housing 70 and the upper surface 32d of the first attaching member 32 in the vertical direction. Thus, the flange portion 82 does not abut on the upper end surface 70a of the housing 70.

The flange portion 82 is fastened to the housing 70 with the pressing bolts B5, and thus the shaft fixing member 80 is fastened to the housing 70. In this case, the first attaching member 32 is pressed downward (toward the head plate 10 and the lift shaft 20) by the pressing bolts B5. As a result, the first attaching member 32 presses the lift shaft 20 toward the head plate 10 side via the upper sealing member 40 and fixes the lift shaft 20 to the lowered position. In this way, when the lift shaft 20 is located in the lowered position, the shaft fixing member 80 presses the lift shaft 20 toward the head plate 10 side via the first attaching member 32 and the upper sealing member 40 and fixes the lift shaft 20 to the lowered position.

The movement restricting member 90 restricts the upward movement of the lift shaft 20 upper than the raised position. The movement restricting member 90 is a bolt made of metal such as stainless steel, for example. The movement restricting member 90 is screwed into the second internal thread hole 22b of the second shaft portion 22. As a result, the movement restricting member 90 is disposed below the head plate 10 and protrudes from the outer peripheral surface of the second shaft portion 22.

The sealing member 3 configured in this way is attached to the upper opening end 2a of the pump column 2 by fastening the head plate 10 to the upper opening end 2a with the plate attaching bolts B1. In this case, a gasket (not illustrated) is disposed between the upper opening end 2a and the head plate 10, thereby liquid-tightly sealing between the head plate 10 and the upper opening end 2a.

Sealing Structure by Using Sealing Member

Next, sealing structure by using the sealing member 3 will be described with reference to FIG. 1 to FIG. 3. The sealing member 3 has the sealing structure that prevents the liquefied gas Lg and the vaporized liquefied gas Vg (hereinafter referred to as "vaporized gas Vg", see FIG. 4, the same applies below) in the pump column 2 from leaking to the outside of the sealing member 3. The sealing structure includes the bellows member 30, the upper sealing member 40, the lower sealing member 50, and the shaft sealing member 60. The sealing structure is able to prevent the liquefied gas Lg and the vaporized gas Vg from leaking to the outside of the sealing member 3, regardless of whether the lift shaft 20 is located in the lowered position or in the raised position.

The sealing structure for each location of the lift shaft 20 will be described below in association with operations to the sealing member 3 (mainly the lift shaft 20).

When the pump 5 is in operation, the liquefied gas Lg discharged from the pump 5 rises in the pump column 2 and is supplied to the outside of the storage tank T from the liquid feeding path R1. The inside of the pump column 2 is filled with the liquefied gas Lg and a discharge pressure from the pump 5 (e.g., maximum 2 MPa) is added to the head plate 10 and the lift shaft 20. In this case, the lift shaft 20 is located in the lowered position and is fixed.

When the lift shaft 20 is located in the lowered position, the liquefied gas Lg flows into a gap between the second shaft portion 22 of the lift shaft 20 and the guide member 13, but the liquefied gas Lg is blocked by the shaft sealing member 60 and does not leak into the space above the shaft sealing member 60 (the bellows internal space S). As a result, the discharge pressure described above is not propagated to the bellows member 30, the upper sealing member 40, and the lower sealing member 50.

When the pump 5 is out of operation, the liquefied gas Lg remains in the pump column 2 to the same level as the liquid level of the liquefied gas Lg in the storage tank T. A space above the liquid level in the pump column 2 is filled with the vaporized gas Vg. Even in this state, due to the sealing structure described above (in particular, shaft sealing member 60), the vaporized gas Vg does not leak into the space (bellows internal space S) above the shaft sealing member 60.

The pump 5 is taken out of the pump column 2 on a regular basis (e.g., every few years), and maintenance for the pump 5 is performed. When the pump 5 is taken out, closing the foot valve 6 and removing the residual gas (liquefied gas Lg and vaporized gas Vg) in the pump column 2 are required. As a previous preparation, the lift shaft 20 is raised from the lowered position to the raised position, and thus the pump 5 is raised to a predetermined height in the pump column 2.

As a previous preparation before the lift shaft 20 is raised, the lid portion 74 and the shaft fixing member 80 are removed. As a result, the pressing by using the pressing bolts B5 is released, and the sealability of the shaft sealing member 60 is deteriorated. Accordingly, the residual gas may leak into the bellows internal space S over the shaft sealing member 60. However, the bellows internal space S is liquid-tightly sealed by the bellows member 30, the upper sealing member 40, and the lower sealing member 50. Thus, the residual gas does not leak from the bellows internal space S to the outside of the sealing member 3. In the present embodiment, the handling liquid is liquefied ammonia, and the vaporized gas Vg is ammonia gas that is flammable and highly toxic to a living body. Since the ammonia gas is lighter than the air, the ammonia gas is easily breathed in by a maintenance worker. Since the bellows member 30 is used in the sealing structure of the sealing member 3 according to the present invention, the sealing member 3 is applicable to a handling liquid that is difficult to handle such as liquefied ammonia.

Then, the cable (not illustrated) from the lift (not illustrated) is connected to the first connecting member 23 of the lift shaft 20, and the lift shaft 20 is raised to the raised position by the lift. In this case, the pump 5 is lifted by the lift shaft 20 via the support cable 4, and the foot valve 6 is closed by the biasing force of the spring (not illustrated).

Figure 4:
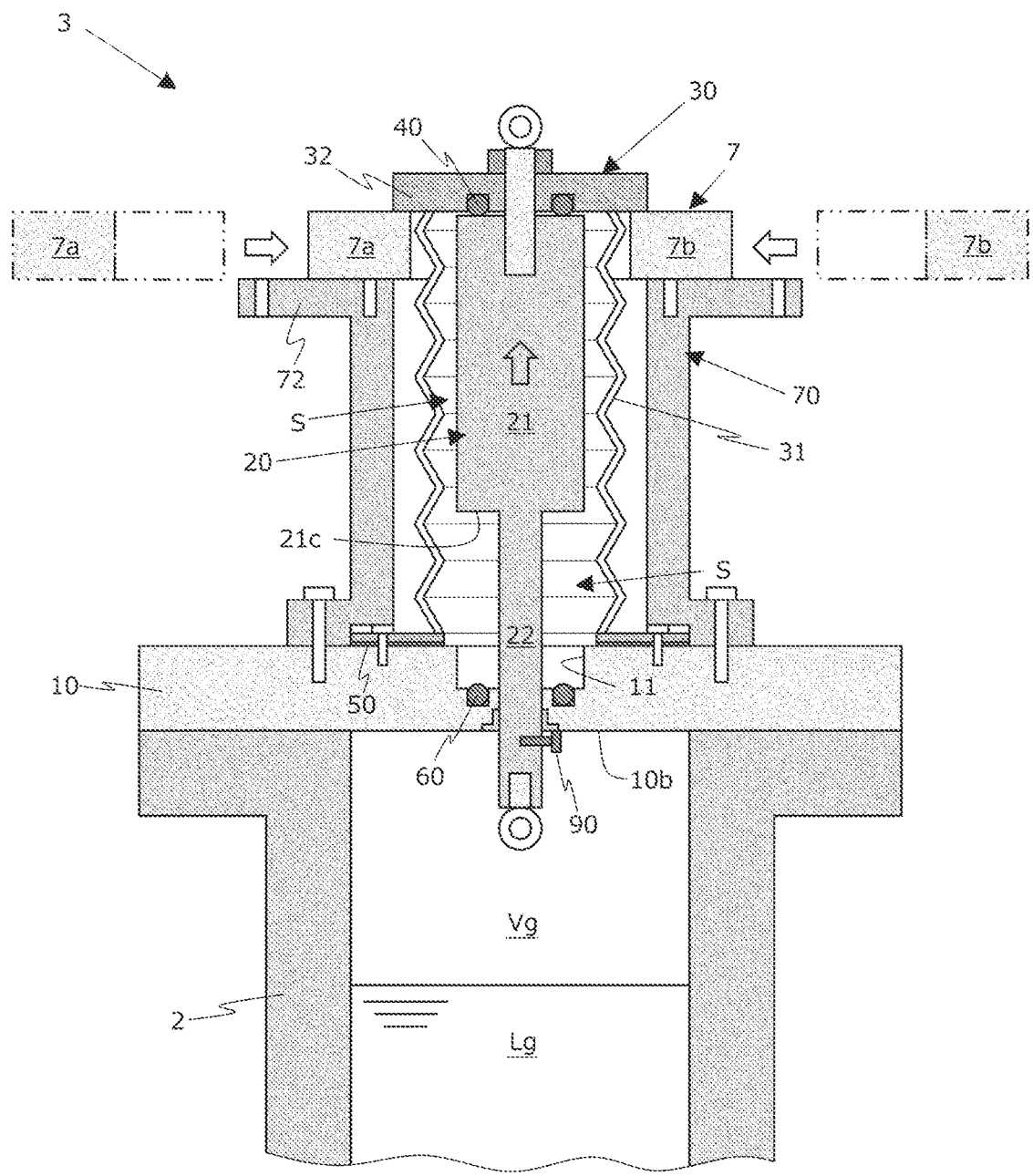
FIG. 4 is a schematic cross-sectional view of the sealing member when a lift shaft included in the sealing member in FIG. 2 is located in a raised position.

FIG. 4 is a schematic cross-sectional view of the sealing member 3 when the lift shaft 20 is located in the raised position.

When the lift shaft 20 is raised to the raised position, the sealing by using the shaft sealing member 60 is released and the bellows internal space S communicates with the space in the pump column 2 via the insertion hole 11. Thus, the residual gas flows into the bellows internal space S via the insertion hole 11. In this case, the bellows tube 31 is extended following the movement of the lift shaft 20. Thus, the sealing state of the bellows internal space S is maintained by the bellows member 30, the upper sealing member 40, and the lower sealing member 50. Accordingly the residual gas does not leak from the bellows internal space S to the outside of the sealing member 3.

When the lift shaft 20 is raised to the raised position, the movement restricting member 90 abuts on the lower surface 10b of the head plate 10, and thus the upward movement of the lift shaft 20 upper than the raised position is restricted. Thus, the bellows tube 31 is not excessively extended, and technical problems such as breakage of the bellows member 30 (bellows tube 31 or welding portion) do not occur.

The outer diameter of the bellows tube 31 when extended is smaller than the outer diameter of the bellows tube 31 when contracted. Meanwhile, as described above, the inner diameter of the color 7 is larger than the outer diameter of the bellows tube 31 when extended and smaller than the inner diameter of the tube portion 71. Thus, the color 7 can be attached between the first attaching member 32 and the first flange portion 72 of the housing 70. When the color 7 is attached between the first attaching member 32 and the first flange portion 72, the lift shaft 20 is fixed to the raised position. In this case, the sealing member 3 suspends and supports the pump 5.

When the lift shaft 20 is located in the raised position, the lower end surface 21c of the first shaft portion 21 is separated from the shaft sealing member 60, and the sealing by using the shaft sealing member 60 is released. Accordingly, the residual gas flows into the bellows internal space S via a gap between the second shaft portion 22 and the insertion hole 11 (the guide member 13). However, as described above; the sealing state of the bellows internal space S is maintained by the bellows member 30, the upper sealing member 40, and the lower sealing member 50. Thus, the residual gas does not leak from the bellows internal space S to the outside of the sealing member 3.

Then, an inert gas is introduced into the pump column 2, and the residual gas in the pump column 2 is returned to the storage tank T. The subsequent process of removing the pump 5 is a known process, and the description thereof is omitted.

Conclusion

According to the embodiment described above, the sealing member 3 includes the head plate 10, the lift shaft 20, and the bellows member 30. The head plate 10 includes the insertion hole 11 extending in the vertical direction and is attached to the upper opening end 2a of the pump column 2 so as to close the upper opening end 2a. The lift shaft 20 is disposed penetrating the insertion hole 11 and is raised and lowered between the raised position and the lowered position when the pump 5 is raised and lowered. The bellows member 30 extends and contracts in the axial direction (the vertical direction) of the lift shaft 20 corresponding to the raising and lowering of the lift shaft 20. The bellows member 30 includes the bellows tube 31, the first attaching member 32, and the second attaching member 33. The bellows tube 31 covers the outer peripheral surface of the protruding portion of the lift shaft 20. The first attaching member 32 is disposed contiguously to the upper end 31a of the bellows tube 31 and is attached to the upper end surface 21b of the first shaft portion 21. The second attaching member 33 is disposed contiguously to the lower end 31b of the bellows tube 31 and is attached to the upper surface 10a of the head plate 10. According to this configuration, the bellows internal space S is surrounded by the bellows member 30. Thus, even though the lift shaft 20 is raised and lowered, the bellows tube 31 extends and contracts corresponding to the raising and lowering of the lift shaft 20, and the bellows internal space S is sealed by the bellows member 30. In this way, in the sealing member 3, the leakage of the liquefied gas hg and the residual gas in raising and lowering the pump 5 is prevented by the bellows member 30.

According to the embodiment described above, the sealing member 3 includes the upper sealing member 40 and the lower sealing member 50. The upper sealing member 40 is disposed between the first attaching member 32 and the upper end surface 21b of the first shaft portion 21. The lower sealing member 50 is disposed between the second attaching member 33 and the upper surface 10a of the head plate 10. This configuration enables liquid-tight sealing between the first attaching member 32 and the upper end surface 21b and between the second attaching member 33 and the upper surface 10a. As a result, the bellows internal space S is liquid-tightly sealed by the bellows member 30, the upper sealing member 40, and the lower sealing member 50. Accordingly in the sealing member 3, the leakage of the liquefied gas Lg and the residual gas in raising and lowering the pump 5 is prevented by the bellows member 30, the upper sealing member 40, and the lower sealing member 50.

According to the embodiment described above, the sealing member 3 includes the shaft sealing member 60 disposed between the head plate 10 and the lift shaft 20. The lift shaft 20 includes the first shaft portion 21 and the second shaft portion 22. The second shaft portion 22 has the outer diameter smaller than the outer diameter of the first shaft portion 21 and is disposed below the first shaft portion 21 and through the insertion hole 11. When the lift shaft 20 is located in the lowered position, this configuration enables liquid-tight sealing between the lower end surface 21c of the first shaft portion 21 and the head plate 10 with the shaft sealing member 60. As a result, when the lift shaft 20 is located in the lowered position, the liquefied gas Lg and the residual gas do not leak into the bellows internal space S. The discharge pressure of the pump 5 is not propagated to the bellows member 30. As a result, the sealability of the sealing member 3 is improved, and technical problems such as breakage of the bellows member 30 due to the discharge pressure do not occur.

According to the embodiment described above, the insertion hole 11 includes the first hole portion 11a and the second hole portion 11b. The second hole portion 11b has the inner diameter smaller than the inner diameter of the first hole portion 11a and is disposed below the first hole portion 11a. When the lift shaft 20 is located in the lowered position, the lower portion of the first shaft portion 21 is disposed into the first hole portion 11a. The second shaft portion 22 is disposed through the second hole portion 11b. The shaft sealing member 60 is disposed between the lower end surface 21c of the first shaft portion 21 and the bottom surface 11d of the first hole portion 11a. When the lift shaft 20 is located in the lowered position, this configuration enables liquid-tight sealing between the lower end surface 21c and the bottom surface 11d with the shaft sealing member 60. As a result, when the lift shaft 20 is located in the lowered position, the liquefied gas Lg and the residual gas do not leak into the bellows internal space S. The discharge pressure of the pump 5 is not propagated to the bellows member 30. As a result, the sealability of the sealing member 3 is improved, and technical problems such as breakage of the bellows member 30 due to the discharge pressure do not occur.

According to the embodiment described above, the sealing member 3 includes the shaft fixing member 80 that fixes the lift shaft 20 to the lowered position. The shaft fixing member 80 presses the lift shaft 20 toward the head plate 10 side by the pressing bolts B5. According to this configuration, even though the discharge pressure of the pump 5 is added to the lift shaft 20, the lift shaft 20 is fixed to the lowered position. Since the shaft sealing member 60 is pressed between the lower end surface 21c of the first shaft portion 21 and the bottom surface 11d of the first hole portion 11a, the sealability of the shaft sealing member 60 is improved.

According to the embodiment described above, the sealing member 3 includes the movement restricting member 90 that restricts the upward movement of the lift shaft 20 upper than the raised position. According to this configuration, the bellows tube 31 is not excessively extended, and technical problems such as breakage of the bellows member 30 do not occur.

Other Embodiments

Note that, in the present invention, the sealing member 3 need not include the shaft sealing member 60. According to this configuration, the discharge pressure from the pump 5 may be propagated to the bellows member 30, but the leakage of the liquefied gas Lg from the bellows internal space S is prevented by the bellows member 30, the upper sealing member 40, and the lower sealing member 50. In this configuration, for example, by bringing the lower end surface 21c of the first shaft portion 21 and the bottom surface 11d of the first hole portion 11a into close contact with each other, the sealability therebetween is ensured to some extent, and the propagation of the discharge pressure may also be eliminated.

In the present invention, the configuration for sealing between the first attaching member 32 and the lift shaft 20 is not limited to the configuration in the present embodiment. That is, for example, the first attaching member 32 may be liquid-tightly attached to the lift shaft 20 by welding.

In the present invention, the upper sealing member 40 is not limited to O-ring. That is, for example, the upper sealing member 40 may be a ring plate-shaped gasket.

In the present invention, the seal groove 32b in which the upper sealing member 40 is disposed may be disposed on the upper end surface 21b of the first shaft portion 21.

In the present invention, the configuration for sealing between the second attaching member 33 and the head plate 10 is not limited to the configuration in the present embodiment. That is, for example, the second attaching member 33 may be liquid-tightly attached to the head plate 10 by welding.

In the present invention, the lower sealing member 50 is not limited to a gasket. That is, for example, the lower sealing member 50 may be a ring-shaped O-ring. In this case, for example, a seal groove in which the lower sealing member 50 is disposed may be disposed on the upper surface 10a of the head plate 10 or on the lower surface 33c of the second attaching member 33.

In the present invention, the bellows tube 31 may be integrally formed with the first attaching member 32 and/or the second attaching member 33. According to this configuration, the strength of the bellows member 30 is improved.

In the present invention, the insertion hole 11 need not include the first hole portion 11a. In this case, for example, the seal groove 12 into which the shaft sealing member 60 is fitted may be disposed on the upper surface 10a of the head plate 10.

In the present invention, the seal groove 12 in which the shaft sealing member 60 is disposed may be disposed on the lower end surface 21c of the first shaft portion 21.

In the present invention, the material of each of the bellows member 30, the upper sealing member 40, the lower sealing member 50, and the shaft sealing member 60 may be appropriately selected according to a handling liquid and is not limited to the material in the present embodiment.

In the present invention, the shaft body formed of the first shaft portion 21 and the second shaft portion 22 may have the same outer diameter from the upper end to the lower end. That is, for example, the shaft body of the lift shaft 20 may be formed of only one of the first shaft portion 21 or the second shaft portion 22. In this case, for example, the insertion hole 11 may have an inner diameter through which the lift shaft 20 can be inserted.

In the present invention, an internal thread portion may be formed on the upper portion of the inner peripheral surface of the tube portion 71 of the housing 70, and the external thread portion corresponding to the internal thread portion may be formed on the outer peripheral surface of the peripheral wall portion 81 of the shaft fixing member 80. According to this configuration, the shaft fixing member 80 is screwed into the tube portion 71, and thus the shaft fixing member 80 can press the lift shaft 20 downward.

In the present invention, the sealing member 3 need not include the movement restricting member 90. In this case, for example, the height of the raised position may be set in advance.

In the present invention, the configuration of the movement restricting member 90 is not limited to the configuration in the present embodiment. That is, for example, the movement restricting member 90 may include a knock pin fitted into the lift shaft 20. For example, the movement restricting member 90 may include a slide rail with a stopper disposed between the first attaching member 32 and the second attaching member 33.

In the present invention, the head plate 10 need not include the guide member 13. In this case, for example, the second hole portion 11b may have the function similar to that of the guide member 13.

In the present invention, the lift shaft 20 may be fixed by the color 7 not in the raised position but in a holding position located below the raised position. In this case, the lift shaft 20 is raised to the raised position, the color 7 is disposed, and then the lift shaft 20 is lowered to the holding position. According to this configuration, the color 7 can be easily disposed.

In the present invention, the bellows member 30 may be connected to a gas path that allows the inert gas to be introduced to the bellows internal space S. In this case, for example, the gas path may be connected to the first attaching member 32. According to this configuration, when the lift shaft 20 is lowered to the lowered position, the liquefied gas Lg and the vaporized gas Vg remaining in the bellows internal space S are discharged into the pump column 2. The inert gas is introduced into the pump column 2 and the bellows internal space S at the same time, and thus the residual gas does not remain in the bellows internal space S.

In the present invention, the insertion hole 11 and the guide member 13 may include a ventilation groove that bypasses the bellows internal space S and the space in the pump column 2 when the pressing to the shaft sealing member 60 by using the pressing bolts B5 is released. This configuration facilitates the inflow of the air into the bellows internal space S and the outflow of the air from the bellows internal space S. As a result, the bellows tube 31 easily extends and contracts.

In the present invention, when the flange portion 82 is fastened to the housing 70 by the pressing bolts B5, the flange portion 82 may or need not abut on the upper end surface 70a of the housing 70. In the former case, the force with which the shaft fixing member 80 presses the first attaching member 32 (pressing force) is uniform in the circumferential direction of the shaft fixing member 80. Even though the shaft fixing member 80 is attached and detached a plurality of times, the pressing force for each attachment is substantially the same. In contrast, in the latter case, the pressing force can be adjusted according to the state of the shaft sealing member 60, for example.

In the present invention, the first attaching member 32 may be integrally formed with the shaft fixing member 80.

Figure 5:
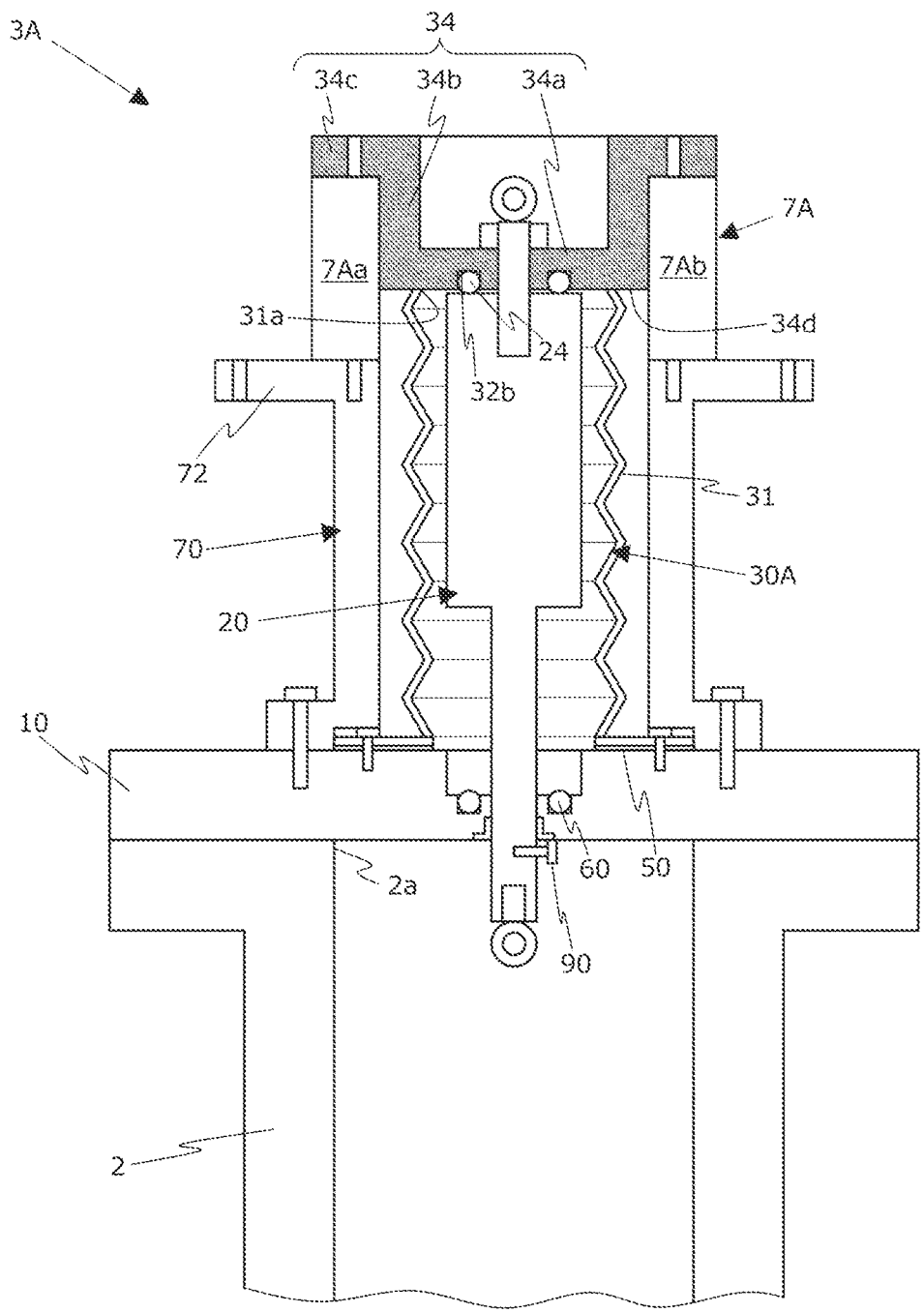
FIG. 5 is a schematic cross-sectional view of the sealing member illustrating a modification example of the sealing member according to the present invention.

FIG. 5 is a schematic cross-sectional view of the sealing member illustrating a modification example of the sealing member according to the present invention.

The figure illustrates a sealing member 3A according to the present modification example when the lift shaft 20 is located in the raised position, The figure also illustrates that a bellows member 30A of the sealing member 3A according to the present modification example includes a first attaching member 34 having a shape in which the first attaching member 32 and the shaft fixing member 80 (both illustrated in FIG. 2) according to the previously described embodiment are integrally formed. In the figure, only the cross-section of the first attaching member 34 is greyed out in order to clarify the first attaching member 34. A difference between the present modification example and the previously described embodiment will be described below.

In the present modification example, the first attaching member 34 includes a ring plate-shaped bottom portion 34a, a cylindrical shaped peripheral wall portion 34b extending upward from an outer edge portion of the bottom portion 34a, and a ring plate-shaped flange portion 34c protruding outward from an upper end of the peripheral wall portion 34b in the radial direction of the bottom portion 34a. The bottom portion 34a is disposed contiguously to the upper end 31a of the bellows tube 31 above the upper end 31a. The upper end 31a of the bellows tube 31 is liquid-tightly welded to a lower surface 34d of the bottom portion 34a over the entire circumference of the bellows tube 31 in the circumferential direction. The seal groove 32b is disposed on the lower surface 34d of the bottom portion 34a. The outer diameter of the flange portion 34c is larger than the outer diameter of the bellows tube 31 (the outer diameter of the crest portion). According to this configuration, when the lift shaft 20 is located in the raised position, the flange portion 34c protrudes more outward than the bellows tube 31 in the radial direction of the bottom portion 34a. Thus, a cylindrical shaped color 7A is attached between the flange portion 34c and the first flange portion 72 of the housing 70, and thus the lift shaft 20 is fixed to the raised position. The color 7A is formed of two half-cylindrical shaped members 7Aa and 7Ab. The inner diameter of the color 7A is larger than the outer diameter of the peripheral wall portion 34b and smaller than the outer diameter of the flange portion 34c. The color 7A is attached between the flange portion 34c and the first flange portion 72, and thus the head plate 10 can be removed from the upper opening end 2a in a state where the lift, shaft 20 is fixed to the raised position (the state where the pump 5 is raised).

Note that, in the present modification example, the tube portion 71, the first flange portion 72, and the second flange portion 73 of the housing 70 may be divisible into two halves along the vertical direction. According to this configuration, the tube portion 71 can accommodate the bellows member 30 after the first attaching member 32 and the second attaching member 33 are welded to the bellows tube 31.

Aspects of the Present Invention

Next, aspects of the present invention conceived from the embodiments described above will be described below with reference to the terms and reference signs described in the embodiments.

A first aspect of the present invention is a sealing member (e.g., the sealing member 3, 3A) for sealing an opening end (e.g., the upper opening end 2a) of a cylindrical pump column (e.g., the pump column 2) configured to accommodate a pump (e.g., the pump 5) configured to be submerged in a handling liquid (e.g., the liquefied gas Lg) and for suspending and supporting the pump when the pump is raised and lowered in the pump column, the sealing member including: a head plate (e.g., the head plate 10) having a through hole (e.g., the insertion hole 11) extending in a vertical direction and attached to the opening end so as to close the opening end; a lift shaft (e.g., the lift shaft 20) disposed through the through hole and raised and lowered between a raised position and a lowered position when the pump is raised and lowered; and a bellows member (e.g., the bellows member 30, 30A) that extends and contracts in an axial direction of the lift shaft corresponding to the raising and lowering of the lift shaft, in which the bellows member includes: a bellows tube (e.g., the bellows tube 31) covering an outer peripheral surface of a protruding portion of the lift shaft protruding upward from the head plate; a first attaching member (e.g., the first attaching member 32, 34) disposed contiguously to an upper end (e.g., the upper end 31a) of the bellows tube and attached to an upper end surface (e.g., the upper end surface 21b) of the lift shaft; and a second attaching member (e.g., the second attaching member 33) disposed contiguously to a lower end (e.g., the lower end 31b) of the bellows tube and attached to an upper surface (e.g., the upper surface 10a) of the head plate.

According to this configuration, even though the lift shaft is raised and lowered, the bellows tube extends and contracts corresponding to the raising and lowering of the lift shaft, and the gap can be sealed by the bellows member. As a result, the leakage of the residual gas in raising and lowering the pump can be prevented by the bellows member.

A second aspect of the present invention is the sealing member in the first aspect, further including an upper sealing member (e.g., the upper sealing member 40) disposed between the first attaching member and the upper end surface of the lift shaft, and a lower sealing member (e.g., the lower sealing member 50) disposed between the second attaching member and the upper surface of the head plate.

According to this configuration, the leakage of the residual gas in raising and lowering the pump can be prevented by the bellows member, the upper sealing member, and the lower sealing member.

A third aspect of the present invention is the sealing member in the first or second aspect, further including a shaft sealing member (e.g., the shaft sealing member 60) disposed between the lift shaft and the head plate, and the lift shaft includes: a first shaft portion (e.g., the first shaft portion 21); and a second shaft portion (e.g., the second shaft portion 22) having an outer diameter smaller than an outer diameter of the first shaft portion and disposed below the first shaft portion and through the through hole, and the shaft sealing member is disposed between a lower end surface (e.g., the lower end surface 21c) of the first shaft portion and the head plate.

According to this configuration, the sealability of the sealing member is improved, and technical problems such as breakage of the bellows member due to the discharge pressure do not occur.

A fourth aspect of the present invention is the sealing member in the third aspect, in which the through hole includes: a first hole portion (e.g., the first through hole portion 11a) into which a lower portion of the first shaft portion is disposed when the lift shaft is located in the lowered position; and a second hole portion (e.g., the second hole portion 11b) having an inner diameter smaller than an inner diameter of the first hole portion and disposed below the first hole portion and through which the second shaft portion is disposed, and the shaft sealing member is disposed between the lower end surface of the first shaft portion and a bottom surface (e.g., the bottom surface 11d) of the first hole portion.

According to this configuration, the sealability of the sealing member is improved, and technical problems such as breakage of the bellows member due to the discharge pressure do not occur.

A fifth aspect of the present invention is the sealing member in any one of the first to fourth aspects, further including a shaft fixing member (e.g., the shaft fixing member 80) that fixes the lift shaft to the lowered position, in which the shaft fixing member presses the lift shaft toward the head plate side via the first attaching member when the lift shaft is located in the lowered position.

According to this configuration, the lift shaft is fixed to the lowered position, and the sealability of the shaft sealing member is improved.

A sixth aspect of the present invention is the sealing member (e.g., the sealing member 3A) in any one of the first to fifth aspects, in which the first attaching member (e.g., the first attaching member 34) includes: a ring plate-shaped bottom portion (e.g., the bottom portion 34a) adjacent to the upper end of the bellows tube; a wall portion (e.g., the peripheral wall portion 34b) extending upward from an outer edge portion of the bottom portion; and a flange portion (e.g., the flange portion 34c) having an outer diameter larger than an outer diameter of the bellows tube and protruding outward from an upper end of the wall portion in a radial direction of the bottom portion.

According to this configuration, the color is disposed below the flange portion, and thus the lift shaft is fixed to the raised position. As a result, the head plate can be removed from the upper opening end in a state where the lift shaft is fixed to the raised position (the state where the pump is raised).

A seventh aspect of the present invention is the sealing member in any one of the first to sixth aspect, further including a movement restricting member (e.g., the movement restricting member 90) that restricts an upward movement of the lift shaft upper than the raised position.

According to this configuration, the bellows tube is not excessively extended, and no defects such as breakage of the bellows tube or welding portion occur.

An eighth aspect of the present invention is a submerged pump system including: a pump configured to be submerged in a handling liquid; a cylindrical pump column configured to accommodate the pump; and the sealing member according to any one of the first to seventh aspects.

According to this configuration, the leakage of the residual gas in raising and lowering the pump can be prevented by the bellows member.

What is claimed is:

1. A sealing member for sealing an opening end of a cylindrical pump column configured to accommodate a pump configured to be submerged in a handling liquid and for suspending and supporting the pump when the pump is raised and lowered in the pump column, the sealing member comprising:
    a head plate having a through hole extending in a vertical direction and attached to the opening end so as to close the opening end;
    a lift shaft disposed through the through hole and raised and lowered between a raised position and a lowered position when the pump is raised and lowered;
    a bellows member configured to extend and contract in an axial direction of the lift shaft corresponding to the raising and lowering of the lift shaft;
    an upper sealing member disposed between the lift shaft and the bellows member; and
    a lower sealing member disposed between the lift shaft and the head plate,
    wherein the bellows member comprises
        a bellows tube covering an outer peripheral surface of a protruding portion of the lift shaft protruding upward from the head plate;
        a first attaching member disposed contiguously to an upper end of the bellows tube and attached to an upper end surface of the lift shaft, wherein the upper end surface of the lift shaft is a horizontal surface; and
        a second attaching member disposed contiguously to a lower end of the bellows tube and attached to an upper surface of the head plate, wherein
            the first attaching member is disposed above the lift shaft,
            the upper sealing member abuts on a lower surface of the first attaching member and the upper end surface of the lift shaft and liquid-tightly seals between the lower surface of the first attaching member and the upper end surface of the lift shaft, and
            the lower sealing member abuts on a lower surface of the second attaching member and the upper surface of the head plate and liquid-tightly seals between the lower surface of the second attaching member and the upper surface of the head plate.

2. The sealing member according to claim 1, further comprising a shaft sealing member disposed between the lift shaft and the head plate, wherein
    the lift shaft includes:
        a first shaft portion; and
        a second shaft portion having an outer diameter smaller than an outer diameter of the first shaft portion and disposed below the first shaft portion and through the through hole, and
    the shaft sealing member is disposed between a lower end surface of the first shaft portion and the head plate.

3. The sealing member according to claim 2, wherein
    the through hole includes:
        a first hole portion into which a lower portion of the first shaft portion is disposed when the lift shaft is in the lowered position; and
        a second hole portion having an inner diameter smaller than an inner diameter of the first hole portion and disposed below the first hole portion and through which the second shaft portion is disposed, wherein
    the shaft sealing member is disposed between the lower end surface of the first shaft portion and a bottom surface of the first hole portion.

4. The sealing member according to claim 2, further comprising a shaft fixing member configured to fix the lift shaft to the lowered position, wherein
    the shaft fixing member presses the lift shaft toward the head plate side via the first attaching member when the lift shaft is in the lowered position.

5. The sealing member according to claim 1, wherein
    the first attaching member includes:
        a ring plate-shaped bottom portion adjacent to the upper end of the bellows tube;
        a wall portion extending upward from an outer edge portion of the bottom portion; and
        a flange portion having an outer diameter larger than an outer diameter of the bellows tube and protruding outward from an upper end of the wall portion in a radial direction of the bottom portion.

6. The sealing member according to claim 1, further comprising a movement restricting member configured to restrict an upward movement of the lift shaft upper than the raised position.

7. A submerged pump system comprising:
    a pump configured to be submerged in a handling liquid;
    a cylindrical pump column configured to accommodate the pump; and
    the sealing member according to claim 1.

8. The sealing member according to claim 2, wherein
    when the lift shaft is in the lowered position, the shaft sealing member is disposed between a lower end surface of the first shaft portion and the head plate and liquid-tightly seals between the lower end surface of the first shaft portion and the head plate, and
    when the lift shaft is in the raised position, the shaft sealing member is separated from the lower end surface of the first shaft portion or the head plate, and the sealing between the lower end surface of the first shaft portion and the head plate is released.

9. The sealing member according to claim 8, wherein the through hole includes a ventilation passage that bypasses a space inside the bellows member and a space inside the pump column when the sealing between the lower end surface of the first shaft portion and the head plate by the shaft sealing member is released.

* * * * *